United States Patent
Zhang et al.

(10) Patent No.: US 11,943,735 B2
(45) Date of Patent: Mar. 26, 2024

(54) INDOOR TARGET POSITIONING METHOD BASED ON IMPROVED CONVOLUTIONAL NEURAL NETWORK MODEL

(71) Applicant: Nanjing University of Posts and Telecommunications, Nanjing (CN)

(72) Inventors: Dengyin Zhang, Nanjing (CN); Yepeng Xu, Nanjing (CN); Yuanpeng Zhao, Nanjing (CN); Yan Yang, Nanjing (CN); Chenghui Qi, Nanjing (CN)

(*) Notice: Subject to any disclaimer, the term of this patent is extended or adjusted under 35 U.S.C. 154(b) by 320 days.

(21) Appl. No.: 17/542,470

(22) Filed: Dec. 5, 2021

(65) Prior Publication Data

US 2022/0386264 A1 Dec. 1, 2022

Related U.S. Application Data

(63) Continuation-in-part of application No. PCT/CN2021/123586, filed on Oct. 13, 2021.

(30) Foreign Application Priority Data

May 21, 2021 (CN) .......................... 202110556627.5

(51) Int. Cl.
*H04W 64/00* (2009.01)
*G06N 3/08* (2023.01)
*H04W 84/12* (2009.01)

(52) U.S. Cl.
CPC .............. *H04W 64/00* (2013.01); *G06N 3/08* (2013.01); *H04W 84/12* (2013.01)

(58) Field of Classification Search
CPC ......... H04W 64/00; H04W 84/12; G06N 3/08
USPC ....................................................... 455/456.1
See application file for complete search history.

(56) References Cited

PUBLICATIONS

CNNLoc: Deep-Learning Based Indoor Localization with WiFi Fingerprinting (Year: 2019).*
Indoor positioning algorithm combining CNN and WiFi fingerprint library (Year: 2020).*

* cited by examiner

*Primary Examiner* — Ahmad F. Matar
*Assistant Examiner* — Jirapon Tulop

(57) ABSTRACT

An indoor target positioning method based on an improved convolutional neural network (CNN) model includes acquiring and preprocessing target camera serial interface (CSI) data of a to-be-positioned target and matching the preprocessed target CSI data with fingerprints in a positioning fingerprint database to obtain coordinate information of the to-be-positioned target. The generation method of the positioning fingerprint database includes: collecting indoor WiFi signals by a software defined radio (SDR) platform to obtain indoor CSI data corresponding to the WiFi signals, and preprocessing the indoor CSI data; partitioning the preprocessed indoor CSI data into a plurality of data subsets through a clustering algorithm; training an improved CNN model by the data subsets to obtain a trained improved CNN model; and generating the positioning fingerprint database by the trained improved CNN model and the preprocessed indoor CSI data.

8 Claims, 3 Drawing Sheets

INDOOR TARGET POSITIONING METHOD BASED ON IMPROVED CONVOLUTIONAL NEURAL NETWORK MODEL

CROSS-REFERENCE TO RELAYED APPLICATIONS

This application is a continuation-in-part of International Patent Application No. PCT/CN2021/123586 with an international filing date of Oct. 13, 2021, designating the United States, now pending, and further claims foreign priority benefits to Chinese Patent Application No. 202110556627.5 filed May 21, 2021. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, MA 02142.

BACKGROUND

The disclosure relates to the field of indoor positioning, and more particularly to an indoor target positioning method based on an improved convolutional neural network (CNN) model.

With the development of urbanization, indoor positioning technology has been widely concerned by people. Global Navigation Satellite System (GNSS) and other known positioning technologies play an increasingly important role in accurate outdoor positioning of objects. However, limited by the interference of reinforced concrete structures on signals, the positioning effect of these technologies cannot meet the requirements for indoor object positioning. In addition, owing to the large area of some indoor places, complex spatial layout structure, and cross-distribution of passages and corridors, global position system (GPS) technology can only receive satellite signals outdoors, so it is difficult for GPS technology and other positioning technologies to realize indoor positioning quickly.

With the massive use of wireless fidelity (Wi-Fi) signals in large indoor environments, Wi-Fi signals have inherent advantages in indoor positioning. However, if the signal is blocked by obstacles in the indoor environment, such as walls, ceilings, closed doors and windows, non-line-of-sight (NLOS) errors will occur (direct light is blocked and only reflected light is visible). In addition, as a smooth object surface will reflect, scatter and diffract direct light in the process of signal propagation, a multi-path phenomenon will occur when a receiver receives all light components generated by reflection, scattering and diffraction of direct light. NLOS errors and multi-path phenomenon will greatly interfere with the accuracy of indoor positioning and affect the indoor positioning effect.

SUMMARY

The disclosure provides an indoor target positioning method based on an improved CNN model, the method comprising:
  acquiring and preprocessing target CSI data of a to-be-positioned target; and
  matching the preprocessed target CSI data with fingerprints in a positioning fingerprint database to obtain coordinate information of the to-be-positioned target.

In a class of this embodiment, the generation method of the positioning fingerprint database comprises:
  collecting indoor WiFi signals by a software defined radio (SDR) platform to obtain indoor CSI data corresponding to the WiFi signals, and preprocessing the indoor CSI data;
  partitioning the preprocessed indoor CSI data into a plurality of data subsets through a clustering algorithm;
  training an improved CNN model by the data subsets to obtain a trained improved CNN model; and
  generating the positioning fingerprint database by the trained improved CNN model and the preprocessed indoor CSI data.

In a class of this embodiment, the SDR platform comprises a mobile node, a plurality of signal base stations and a data processing unit; the mobile node is configured to periodically broadcast probe request frames and automatically send positioning requests; each signal base station is configured to receive the positioning requests of the mobile node and acquire WiFi signals of the mobile node; and the data processing unit is configured to process the WiFi signals acquired by the signal base stations to obtain the indoor CSI data corresponding to the WiFi signals.

In a class of this embodiment, preprocessing target camera serial interface (CSI) data comprises:
  performing amplitude filtering, phase correction, and mean removal on the indoor CSI data to obtain corrected CSI data; and
  reducing dimension of and eliminating noise of the corrected CSI data by principal component analysis (PCA) to obtain the preprocessed CSI data.

In a class of this embodiment, partitioning the preprocessed indoor CSI data into a plurality of data subsets through a clustering algorithm comprises:
  dividing the preprocessed indoor CSI data into multiple data subsets by clustering algorithm, and each data subset comprising multiple indoor CSI data;
  calculating a center of each data subset based on a k-means algorithm by following formula:

$$\mu_i = \frac{1}{\|C_i\|}\sum_{x\in C_i} x; \qquad (1)$$

where $\mu_i$ represents the center of the $i^{th}$ data subset, $C_i$ represents the $i^{th}$ data subset, x represents the indoor CSI data, i=1, ..., k, where k is the number of data subsets;
  calculating a square error of all data subsets based on the center of the data subset by following formula:

$$E=\sum_{i=1}^{k}\sum_{x\in C_i}\|x-\mu_i\|_2^2 \qquad (2);$$

where E represents the square error of all data subsets; and
  calculating a distance between the preprocessed indoor CSI data and the center of each data subset, re-partitioning the data subsets according to the distance until the square error is minimized, thereby obtaining a final data subset.

In a class of this embodiment, the improved CNN model comprises five convolution layers, a first fully connected layer, and a second fully connected layer connected in sequence; the five convolution layers comprise 16, 32, 64, 64 and 128 kernels, respectively; the first fully connected layer is configured to flatten outputs of a fifth convolution layer, and the second fully connected layer is configured to output the partitioned CSI data.

In a class of this embodiment, training an improved CNN model by the data subsets comprises:
  standardizing each indoor CSI data in each data subset:

$$x_p = \frac{\text{var}_p - \text{mean}(\text{var}_p)}{\text{total}(\text{var}_p)}; \qquad (3)$$

where $x_p$ represents a $p^{th}$ indoor CSI data after being standardized, $\text{var}_p$ represents a $p^{th}$ indoor CSI data in the data subset, mean ( ) is a function MEAN, total ( ) is a function SUBTOTAL, p=1, . . . , n, where n is a number of indoor CSI data in each data subset;

initializing model parameters of the improved CNN model, inputting the standardized indoor CSI data in each data subset into the convolution layers of the improved CNN model to obtain the convoluted indoor CSI data, and extracting features of the convoluted indoor CSI data;

batching, max-pooling and activating the features of the convoluted indoor CSI data to obtain mappings of the convoluted indoor CSI data;

classifying the mappings of the convoluted indoor CSI data by the second fully connected layer of the improved CNN model to obtain the coordinate information corresponding to each indoor CSI data in each data subset;

calculating losses of the improved CNN model by a loss function based on a default real coordinate label and the coordinate information output by the improved CNN model; and updating the model parameters of the improved CNN model based on the losses, and processing the standardized indoor CSI data by the updated improved CNN model until the losses converge, to obtain the trained improved CNN model.

In a class of this embodiment, batching the features of each convoluted indoor CSI data comprises:

calculating the mean based on the features of the convoluted indoor CSI data:

$$U_B = \frac{1}{M} \sum_{q=1}^{M} s_q; \qquad (4)$$

where $U_B$ represents the mean of the features of the convoluted indoor CSI data, M is a number of features of each convoluted indoor CSI data, $s_q$ represents the features of the $q^{th}$ convoluted indoor CSI data, q=1, . . . , M;

calculating a variance of the features based on $U_B$ by following formula:

$$\sigma_B^2 = \frac{1}{M} \sum_{q=1}^{M} (s_q - U_B)^2; \qquad (5)$$

where $\sigma_B^2$ represents the variance of the features of the convoluted indoor CSI data;

standardizing the features of the convoluted indoor CSI data based on $U_B$ and $\sigma_B^2$:

$$\hat{x}_t = \frac{s_q - U_B}{\sqrt{\sigma_B^2 + \varepsilon}}; \qquad (6)$$

where $\hat{x}_t$ represents the standardized features of the indoor CSI data, and $\varepsilon$ is a default standardized value.

In a class of this embodiment, the coordinate information corresponding to each indoor CSI data in each data subset is calculated by following formula:

$$y_p = \gamma \hat{x}_{t_p} + \beta \qquad (7);$$

where $y_p$ represents the coordinate information corresponding to the $p^{th}$ indoor CSI data in the data subset, $\gamma$ and $\beta$ are the model parameters of the improved CNN model, respectively, $\hat{x}_{t_p}$ represents the standardized features of the $p^{th}$ indoor CSI data in the data subset.

In a class of this embodiment, the loss function is expressed as follows:

$$L = -\Sigma_p y'_p \log(y_p) \qquad (8);$$

where L represents the losses of the improved CNN model, $y'_p$ represents the real coordinate label of the $p^{th}$ indoor CSI data in the data subset, $y_p$ represents the coordinate information corresponding to the $p^{th}$ indoor CSI data in the data subset.

In a class of this embodiment, the positioning fingerprint database comprises CSI data and coordinate information corresponding to the CSI data.

The following advantages are associated with the indoor target positioning method based on an improved CNN model of the disclosure.

According to the indoor target positioning method based on an improved CNN model of the disclosure, the collected CSI data are preprocessed to remove noise interference, and then the indoor CSI data are partitioned into a plurality of data subsets by a dataset partitioning method, which is beneficial to improving the performance of position estimation, reducing the computation burden in the position estimation process and further improving the accuracy of indoor positioning data. In addition, the indoor CSI data in the data subset are processed by the improved CNN model to extract multi-path and non-line-of-sight (NLOS) effects, and the multi-path and NLOS effects are eliminated even better by a fitting curve of a neural network to obtain accurate coordinate information for indoor positioning, which effectively improves the accuracy of indoor positioning.

According to the disclosure, positioning can be realized using Wi-Fi signals covering large indoor places instead of using new positioning instruments, thus reducing the cost and bringing great convenience. Preprocessing data by the PCA can remove most of the background noise and reduce the data dimension, so that CSI signals may also be applied to indoor positioning in multi-path and NLOS environments. Partitioning data subsets can effectively reduce noise and remove redundancy of each data subset, so as to eliminate the final error of each data subset and improve the positioning accuracy. The improved CNN model is adopted to learn the features of input data, which solves the problem of high computation burden of multidimensional data, and also accurately extracts the coordinate information.

DETAILED DESCRIPTION

To further illustrate the disclosure, embodiments detailing an indoor target positioning method based on an improved CNN model are described below. It should be noted that the following embodiments are intended to describe and not to limit the disclosure.

Figure 1:
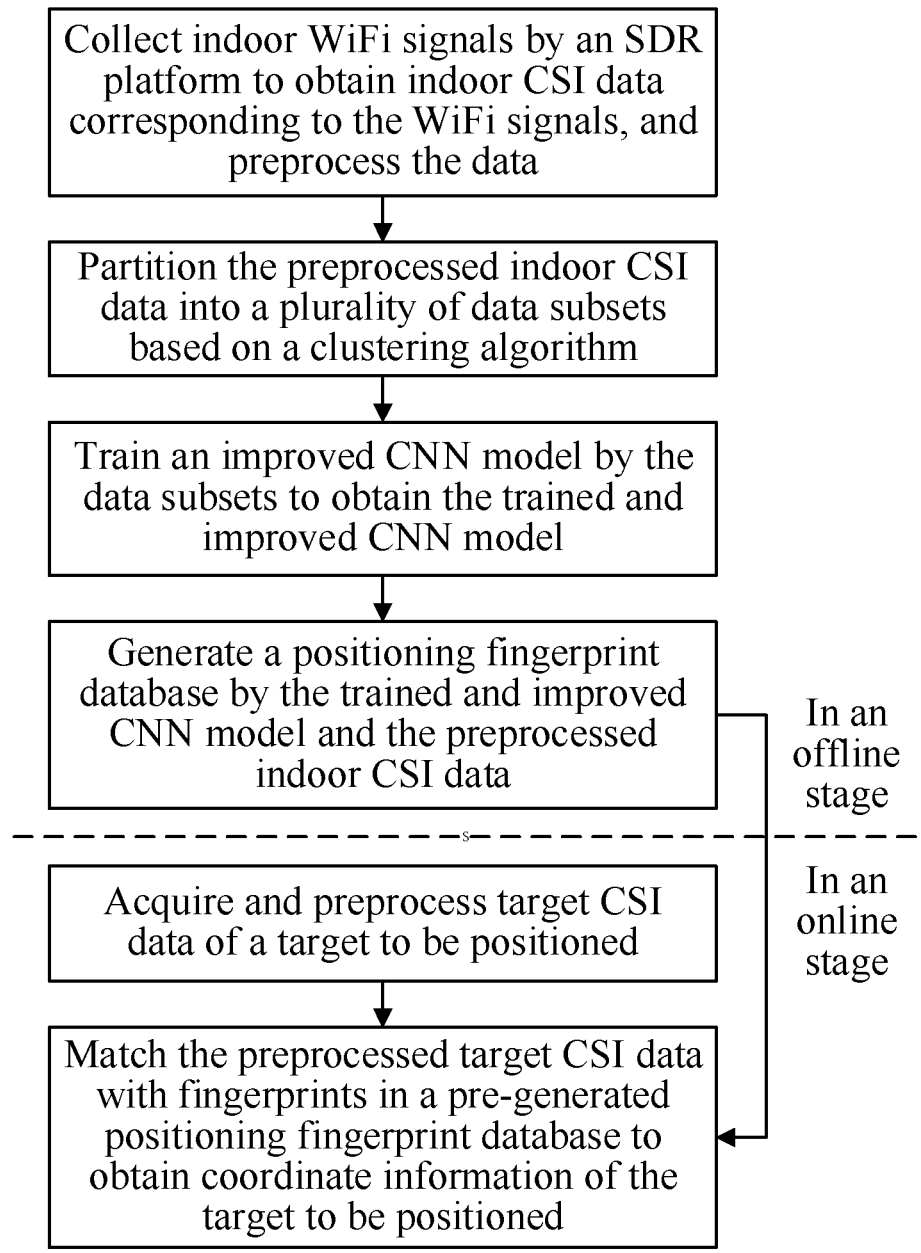
FIG. 1 is a flowchart of an indoor target positioning method based on an improved CNN model according to the disclosure.

According to the disclosure, an indoor target positioning method based on an improved CNN model is proposed. As shown in FIG. 1, the method can be used in an offline stage and an online stage; the model is trained and a fingerprint database is generated in the offline stage, while the real-time indoor target positioning is realized in the online stage by the fingerprint database generated in the offline stage.

According to the disclosure, the method comprises the following steps 1 and 2.

Step 1, the target CSI data of a to-be-positioned target are acquired and preprocessed; and Step 2, the preprocessed target CSI data are matched with fingerprints in a positioning fingerprint database to obtain coordinate information of the to-be-positioned target.

The generation method of the positioning fingerprint database comprises the following steps A to D.

In step A, indoor WiFi signals are collected by an SDR platform to obtain indoor CSI data corresponding to the WiFi signals, and the data are preprocessed.

In step B, the preprocessed indoor CSI data are partitioned into a plurality of data subsets through a clustering algorithm.

In step C, the improved CNN model is trained by the data subsets to obtain the trained improved CNN model.

In step D, a positioning fingerprint database is generated by the trained improved CNN model and the preprocessed indoor CSI data.

According to the disclosure, the SDR platform is configured to collect data, which can collect WiFi signals and obtain CSI data by the WiFi signals. The CSI data contains more position information than radio frequency identification devices (RFID) and received signal strength indicators (RSSI), which makes it easier to extract multi-path components and is conducive to improving the accuracy of indoor positioning. The SDR platform comprises a mobile node, a plurality of signal base stations and a data processing unit. Both the mobile node and the signal base stations are defined by an SDR device, and the mobile node can periodically broadcast probe request frames and automatically send positioning requests. Each signal base station is configured to receive the positioning requests from the mobile node and acquire the WiFi signals of the mobile node. A special baseband receiver is disposed behind an RF front end in the base station to reduce the carrier frequency offset and improve the received signal to noise ratio. The data processing unit is connected to the signal base station through a coaxial cable, and is configured to process the WiFi signals acquired by the signal base stations to obtain the indoor CSI data corresponding to the WiFi signals. When the mobile node sends the positioning requests, the probe request frame, which belongs to a management frame and strictly complies with an ieee802.11b protocol, is taken as a request signal.

In step 1 and the step A, the data may be preprocessed through principal component analysis (PCA) in which a set of linearly irrelevant variables can be extracted from vast amounts of CSI data, thus solving the complexity and data transmission problems associated with super-high dimensional CSI data in complex environments. The data preprocessing comprises following steps (1) to (4).

In step (1), amplitude filtering, phase correction and mean removal are performed on the CSI data to obtain corrected CSI data, and the mean of the CSI data after mean removal is 0 in each feature dimension.

In step (2), dimension reduction and noise elimination are performed on the corrected CSI data through PCA. PCA essentially takes the direction with the largest variance as a main feature, and "dissociates" the data in each orthogonal direction, i.e., makes them irrelevant in different directions, which minimizes the impact of noise on experimental data.

The variance of the corrected CSI data is calculated through PCA by the following formula:

$$\text{Var}(x) = \frac{1}{m}\sum_{j=1}^{m} x_j^2; \qquad (9)$$

where Var(x) represents the variance of the corrected CSI data, m is the number of corrected CSI data, $x_j^2$ represents the square of the value of the $j^{th}$ corrected CSI data, j=1, . . . , m.

In step (3), a CSI feature vector is calculated by the variance of the corrected CSI data; each CSI data contains values in three dimensions (x, y and z axes in a three-dimensional space coordinate system), and mapping directions of the values in three dimensions in the three-dimensional space constitute a mapping direction w, where w=(w_1, w_2, w_3), and w_1, w_2 and w_3 of the CSI data represent the mapping directions of the values in three dimensions in x, y and z axes, respectively. According the disclosure, a maximum CSI feature vector is obtained after being mapped to the direction w by gradient boosting:

$$\nabla f = \frac{2}{m} X^T (Xw); \qquad (10)$$

where ∇f represents the variation of gradient, and X represents the CSI feature vector.

In step (4), the maximum variance of the corrected CSI data is obtained by formula (10), and the corrected CSI data are processed based on the maximum variance to obtain the CSI data after dimension reduction and noise elimination, i.e., the preprocessed CSI data.

To improve the learning performance of position estimation, a dataset partitioning method is proposed in the disclosure, which partitions a fingerprint database set of each small indoor space into several subsets, and a center of each data subset may be obtained based on a k-means clustering algorithm. Through PCA, the noise can be effectively reduced, and the redundancy of each data subset can be removed, so as to extract multi-path and non-line-of-sight (NLOS) effects of each data subset, which can improve the learning performance of position estimation, eliminate the final error and improve the positioning accuracy.

In the embodiment of the disclosure, the step B comprises following substeps B01 to B04.

In step B01, the preprocessed indoor CSI data are randomly partitioned into a plurality of data subsets based on the geographical position, and each data subset comprises a plurality of indoor CSI data. For large indoor places, the data subsets may be randomly partitioned according to the layout of shops and floors in the indoor places, or based on a default area (for example, 50 m²).

In step B02, the data subsets are taken as clusters in the clustering algorithm, the center of each data subset is calculated based on the k-means algorithm by following specific formula:

$$\mu_i = \frac{1}{\|C_i\|} \sum_{x \in C_i} x; \qquad (1)$$

where $\mu_i$ represents the center of the $i^{th}$ data subset (i.e., a mean component of the cluster, also known as the center of mass), $C_i$ represents the $i^{th}$ data subset, x represents the indoor CSI data, i=1, ..., k, where k is the number of data subsets.

In step B03, in order to make points in the cluster closely connected together and make the distance between the clusters as large as possible, in the disclosure, a square error of all data subsets is calculated based on the center of the data subsets, and iteration is performed until the square error is minimized. The square error is calculated by the following formula:

$$E = \sum_{i=1}^{k} \sum_{x \in C_i} \|x - \mu_i\|_2^2 \qquad (2);$$

where E represents the square error of all data subsets.

In step B04, a distance between the preprocessed indoor CSI data and the center of each data subset is calculated, and the data subsets are re-partitioned based on the distance, the steps B02 to B03 are repeated until the square error is minimized to obtain a final data subset.

Figure 2:
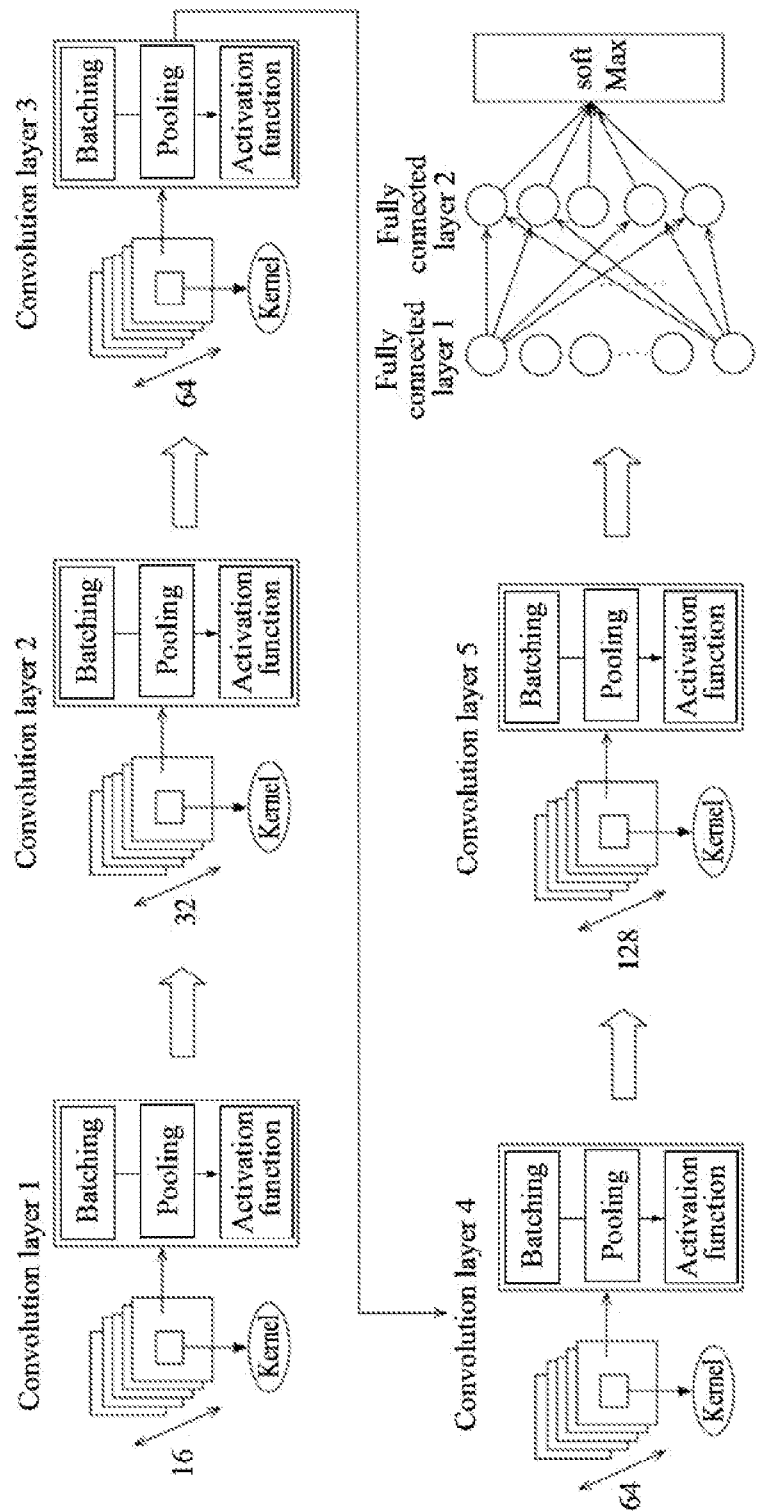
FIG. 2 is a structural diagram of an improved CNN model according to an embodiment of the disclosure.

The improved CNN model is adopted in step C of the embodiment of the disclosure. As shown in FIG. 2, the improved CNN model comprises five convolution layers and two fully connected layers connected in sequence, where the five convolution layers comprise 16, 32, 64, 64 and 128 kernels, respectively. In the first convolution layer, a convolution operation is performed to track results in the 16 kernels and extract information from the results, and then perform batch normalization, max-pooling and activation. In the second convolution layer, the 32 kernels are configured to track results and extract information, and each kernel is 16 in height, which is equivalent to the number of kernels in the first convolution layer. The data processing step in the third, fourth and fifth convolution layers is the same as that in the second convolution layer. The first fully connected layer is configured to flatten outputs of the fifth convolution layer. The second fully connected layer is configured to output the partitioned CSI data. The multi-path and NLOS effects are partitioned into five windows in the disclosure: (1) a monitoring window without NLOS and multi-path effects; (2) a monitoring window in which NLOS effects appear; (3) a monitoring window in which NLOS effects disappear; (4) a monitoring window in which multi-path effects appear; and (5) a monitoring window in which multi-path effects disappear, and five neural nodes of the second fully connected layer respectively represent the five windows defined by the disclosure.

A regression model for position estimation and a classification model for removing noise interference may be obtained by training the data subsets by the CNN model. The step C comprises following steps C01 to C06.

In step C01, in order to reduce the impact of data correlation errors and improve the speed of network convergence, the method in the disclosure standardizes each indoor CSI data in each data subset:

$$x_p = \frac{\text{var}_p - \text{mean}(\text{var}_p)}{\text{total}(\text{var}_p)}; \qquad (3)$$

where $x_p$ represents the $p^{th}$ indoor CSI data after being standardized, $\text{var}_p$ represents the $p^{th}$ indoor CSI data in the data subset, mean ( ) is a function MEAN, total ( ) is a function SUBTOTAL, p=1, ..., n, where n is the number of indoor CSI data in each data subset.

In step C02, model parameters of the improved CNN model are initialized, the standardized indoor CSI data in each data subset are input into the convolution layers of the improved CNN model to obtain the convoluted indoor CSI data, and features of the convoluted indoor CSI data are extracted.

The indoor CSI data in each data subset are input into the convolution layers in sequence, and the features of the tracking results (the convoluted indoor CSI data) are extracted by a series of kernel functions. One kernel generates one tracking result feature mapping, and elements in the kernel are determined by network training. Each kernel is a three-dimensional matrix, with its rows and columns as user defined hyper-parameters.

In step C03, batching, max-pooling and activation are performed on the features of the convoluted indoor CSI data to obtain mappings of the convoluted indoor CSI data.

Batching can speed up network training, allow higher learning rates, make initial weighting easier, and simplify the creation of deep networks. The batching in the embodiment of the disclosure comprises following steps (1) to (3).

In step (1), the mean is calculated based on the features of the convoluted indoor CSI data:

$$U_B = \frac{1}{M} \sum_{q=1}^{M} s_q; \qquad (4)$$

where $U_B$ represents the mean of the features of the convoluted indoor CSI data, M is the number of features of each convoluted indoor CSI data, $s_q$ represents the features of the $q^{th}$ convoluted indoor CSI data, q=1, ..., M.

In step (2), a variance of the features is calculated based on $U_B$ by following formula:

$$\sigma_B^2 = \frac{1}{M} \sum_{q=1}^{M} (s_q - U_B)^2; \qquad (5)$$

where $\sigma_B^2$ represents the variance of the features of the convoluted indoor CSI data.

In step (3), the features of the convoluted indoor CSI data are standardized based on $U_B$ and $\sigma_B^2$:

$$\hat{x}_i = \frac{s_q - U_B}{\sqrt{\sigma_B^2 + \varepsilon}}; \qquad (6)$$

where $\hat{x}_i$ represents the standardized features of the indoor CSI data, and $\varepsilon$ is a default standardized value.

Pooling is an important concept of convolution layer, which is in form of nonlinear down-sampling. According to the disclosure, the tracking results are partitioned into a set of non-overlapping rectangles by max-pooling, and a maximum value is output in each rectangle. On the premise of keeping the main features, the computation burden is reduced by reducing the number of parameters.

According to the disclosure, the method performs activation by taking Leaky ReLU as an activation function, and the activation function can make the CNN neural network show nonlinear features.

In step C04, the mappings of the convoluted indoor CSI data are classified by the second fully connected layer of the improved CNN model to obtain the coordinate information corresponding to each indoor CSI data in each data subset.

Each fully connected layer is a column vector comprising a plurality of nerve units, and coordinate information output thereby is calculated by following formula:

$$y_p = \gamma \hat{x}_{t_p} + \beta \qquad (7);$$

where $y_p$ represents the coordinate information corresponding to the $p^{th}$ indoor CSI data in the data subset, $\gamma$ and $\beta$ are the model parameters of the improved CNN model, respectively, $\hat{x}_{t_p}$ represents the standardized features of the $p^{th}$ indoor CSI data in the data subset.

In step C05, based on a default real coordinate label (i.e., the real 3D coordinate information corresponding to the CSI data) and the coordinate information ($y_p$) output by the improved CNN model, losses of the improved CNN model are calculated by a loss function by following formula:

$$L = -\Sigma_p y'_p \log(y_p) \qquad (8);$$

where L represents the losses of the improved CNN model, $y'_p$ represents the real coordinate label of the $p^{th}$ indoor CSI data in the data subset, and $y_p$ represents the coordinate information corresponding to the $p^{th}$ indoor CSI data in the data subset.

In step C06, the model parameters of the improved CNN model are updated based on the losses, and the standardized indoor CSI data are processed by the updated improved CNN model. The steps C02 to C06 are repeated, and the loss convergence is observed through a loss function diagram. When the losses converge, the trained improved CNN model is obtained.

According to the disclosure, in step D, a large number of indoor CSI data are collected and processed by the trained improved CNN model, so that the coordinate information corresponding to the CSI data can be obtained, and the positioning fingerprint database is generated by the CSI data and the corresponding coordinate information.

Figure 3:
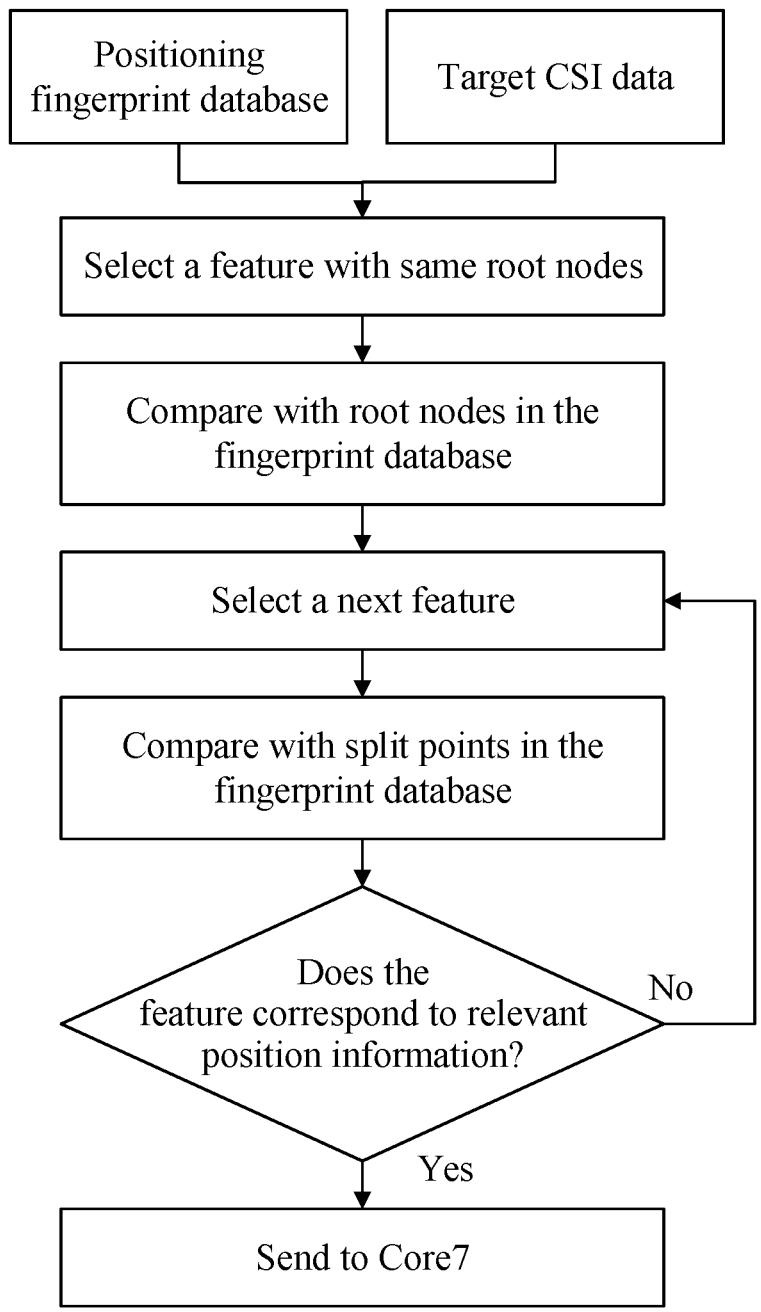
FIG. 3 is a flowchart of a fingerprint matching step according to the embodiment of the disclosure.

According to the disclosure, the obtained positioning fingerprint database can be used directly for indoor positioning in the online stage, and the target CSI data of the to-be-positioned target are collected by the SDR platform. In step 2, the target CSI data are compared with the data in the positioning fingerprint database, and if the target CSI data are the same as the CSI data in the positioning fingerprint database, coordinate information can be directly extracted from the fingerprint database. In addition, considering that the target CSI data may not be exactly the same as the CSI data in the positioning fingerprint database, the fingerprint matching in the disclosure may also be performed according to the steps shown in FIG. 3, multi-dimensional data operation and matching are performed based on the features of a root node and a split point, and the coordinate information with the highest matching degree is selected.

According to the disclosure, the collected CSI data are processed by PCA and a data subset partitioning method, so as to remove noise interference and preliminarily improve the accuracy of positioning. The CSI data in the data subset are put into the improved CNN model for training, so as to suppress multi-path components and further improve the accuracy of indoor positioning. The method according to the disclosure can effectively remove noise and multi-path components, improve the accuracy of positioning and realize its application value in large indoor places.

It will be obvious to those skilled in the art that changes and modifications may be made, and therefore, the aim in the appended claims is to cover all such changes and modifications.

What is claimed is:

1. A method, comprising:
    acquiring and preprocessing target camera serial interface (CSI) data of a to-be-positioned target; and
    matching preprocessed target CSI data with fingerprints in a positioning fingerprint database to obtain coordinate information of the to-be-positioned target;
    wherein:
    a generation method of the positioning fingerprint database comprises:
    collecting indoor WiFi signals by a software defined radio (SDR) platform to obtain indoor CSI data corresponding to the indoor WiFi signals, and preprocessing the indoor CSI data;
    partitioning the preprocessed indoor CSI data into a plurality of data subsets through a clustering algorithm;
    training an improved convolutional neural network (CNN) model by the plurality of data subsets to obtain a trained improved CNN model; and
    generating the positioning fingerprint database by the trained improved CNN model and the preprocessed indoor CSI data;
    wherein partitioning the preprocessed indoor CSI data into the plurality of data subsets through the clustering algorithm comprises:
    dividing the preprocessed indoor CSI data into the plurality of data subsets by the clustering algorithm, and each data subset comprising a plurality of the indoor CSI data;
    calculating a center of each data subset based on a k-means algorithm by following formula:

$$\mu_i = \frac{1}{\|C_i\|} \sum_{x \in C_i} x; \qquad (1)$$

where $\mu_i$ represents a center of an $i^{th}$ data subset, $C_i$ represents the $i^{th}$ data subset, x represents the indoor CSI data i=1, ..., k, where k is a number of data subsets;

calculating a square error of all data subsets based on the center of the $i^{th}$ data subset by following formula:

$$E = \Sigma_{i=1}^{k} \Sigma_{x \in C_i} \|x - \mu_i\|_2^2 \qquad (2);$$

where E represents the square error of all data subsets; and calculating a distance between the preprocessed indoor CSI data and the center of each data subset, re-partitioning the data subsets according to the distance until the square error is minimized, thereby obtaining a final data subset.

2. The method of claim 1, wherein the SDR platform comprises a mobile node, a plurality of signal base stations and a data processing unit; the mobile node is configured to periodically broadcast probe request frames and automatically send positioning requests; each signal base station is configured to receive the positioning requests of the mobile node and acquire WiFi signals of the mobile node; and the data processing unit is configured to process the WiFi signals acquired by the signal base stations to obtain the indoor CSI data corresponding to the WiFi signals.

3. The method of claim 1, wherein preprocessing the target CSI data comprises:
    performing amplitude filtering, phase correction, and mean removal on the indoor CSI data to obtain corrected CSI data; and
    reducing dimension of and eliminating noise of the corrected CSI data by principal component analysis (PCA) to obtain the preprocessed target CSI data.

4. The method of claim 1, wherein the positioning fingerprint database comprises CSI data and coordinate information corresponding to the CSI data.

5. A method, comprising:
acquiring and preprocessing target camera serial interface (CSI) data of a to-be-positioned target; and
matching preprocessed target CSI data with fingerprints in a positioning fingerprint database to obtain coordinate information of the to-be-positioned target;
wherein:
a generation method of the positioning fingerprint database comprises:
collecting indoor WiFi signals by a software defined radio (SDR) platform to obtain indoor CSI data corresponding to the indoor WiFi signals, and preprocessing the indoor CSI data;
partitioning the preprocessed indoor CSI data into a plurality of data subsets through a clustering algorithm;
training an improved convolutional neural network (CNN) model by the plurality of data subsets to obtain a trained improved CNN model; and
generating the positioning fingerprint database by the trained improved CNN model and the preprocessed indoor CSI data;
wherein the improved CNN model comprises five convolution layers, a first fully connected layer, and a second fully connected layer connected in sequence; the five convolution layers comprise 16, 32, 64, 64 and 128 kernels, respectively; the first fully connected layer is configured to flatten outputs of a fifth convolution layer, and the second fully connected layer is configured to output partitioned CSI data;
wherein training the improved CNN model by the data subsets comprises:
standardizing each indoor CSI data in each data subset:

$$x_p = \frac{\text{var}_p - \text{mean}(\text{var}_p)}{\text{total}(\text{var}_p)}; \quad (3)$$

where $x_p$ represents a $p^{th}$ indoor CSI data after being standardized, $\text{var}_p$ represents the $p^{th}$ indoor CSI data in the data subset, mean( ) is a function MEAN, total( ) is a function SUBTOTAL, p=1, . . . , n, where n is a number of indoor CSI data in each data subset;
initializing model parameters of the improved CNN model inputting the indoor CSI data standardized in each data subset into the five convolution layers of the improved CNN model to obtain the convoluted indoor CSI data, and extracting features of the convoluted indoor CSI data;
batching, max-pooling and activating the features of the convoluted indoor CSI data to obtain mappings of the convoluted indoor CSI data;
classifying the mappings of the convoluted indoor CSI data by the second fully connected layer of the improved CNN model to obtain coordinate information corresponding to each indoor CSI data in each data subset;
calculating losses of the improved CNN model b a loss function based on a default real coordinate label and the coordinate information output by the improved CNN model; and updating the model parameters of the improved CNN model based on the losses, and processing, by an updated improved CNN model, the indoor CSI data standardized until the losses converge, to obtain the trained improved CNN model.

6. The method of claim 5, wherein batching the features of each convoluted indoor CSI data comprises:
calculating a mean based on the convoluted indoor CSI data:

$$U_B = \frac{1}{M}\sum_{q=1}^{M} s_q; \quad (4)$$

where $U_B$ represents the mean of the features of the convoluted indoor CSI data, M is a number of features of each convoluted indoor CSI data, $s_q$ represents the features of a $q^{th}$ convoluted indoor CSI data, q=1, . . . , M;
calculating a variance of the features based on $U_B$ by following formula;

$$\sigma_B^2 = \frac{1}{M}\sum_{q=1}^{M} (s_q - U_B)^2; \quad (5)$$

where $\sigma_B^2$ represents the variance of the features of the convoluted indoor CSI data;
standardizing the features of the convoluted indoor CSI data based on $U_B$ and $\sigma_B^2$:

$$\hat{x}_i = \frac{s_q - U_B}{\sqrt{\sigma_B^2 + \varepsilon}}; \quad (6)$$

where $\hat{x}_i$ represents standardized features of the convoluted indoor CSI data, and $\varepsilon$ is a default standardized value.

7. The method of claim 5, wherein the coordinate information corresponding to each indoor CSI data in each data subset is calculated by following formula:

$$y_p = \gamma \hat{x}_{ip} + \beta \quad (7);$$

where $y_p$ represents the coordinate information corresponding to the $p^{th}$ indoor CSI data in the data subset, $\gamma$ and $\beta$ are the model parameters of the improved CNN model, respectively, and $\hat{x}_{ip}$ represents the standardized features of the $p^{th}$ indoor CSI data in the data subset.

8. The method of claim 5, wherein the loss function is expressed as follows:

$$L = -\Sigma_p y'_p \log(y_p) \quad (8);$$

where L represents the losses of the improved CNN model, $y'_p$ represents a real coordinate label of the $p^{th}$ indoor CSI data in the data subset, and $y_p$ represents the coordinate information corresponding to the $p^{th}$ indoor CSI data in the data subset.

* * * * *